(12) United States Patent
Black

(10) Patent No.: US 8,374,402 B2
(45) Date of Patent: Feb. 12, 2013

(54) DATA SECURITY SYSTEM

(75) Inventor: Gerald R. Black, Southfield, MI (US)

(73) Assignee: Pen-One, Inc., Greensboro, NC (US)

( * ) Notice: Subject to any disclaimer, the term of this patent is extended or adjusted under 35 U.S.C. 154(b) by 0 days.

(21) Appl. No.: 13/241,817

(22) Filed: Sep. 23, 2011

(65) Prior Publication Data

US 2012/0027265 A1 Feb. 2, 2012

Related U.S. Application Data

(60) Continuation of application No. 12/857,819, filed on Oct. 25, 2010, which is a continuation of application No. 11/124,016, filed on Aug. 8, 2005, now Pat. No. 7,822,232, which is a division of application No. 10/032,591, filed on Oct. 28, 2001, now Pat. No.

(Continued)

(51) Int. Cl.
G06K 9/00 (2006.01)

(52) U.S. Cl. .................... 382/116; 382/118; 382/124

(58) Field of Classification Search .................. None
See application file for complete search history.

(56) References Cited

U.S. PATENT DOCUMENTS

| | | | |
|---|---|---|---|
| 4,513,437 A | | 4/1985 | Chaimen et al. |
| 4,993,068 A | * | 2/1991 | Piosenka et al. ............. 713/186 |
| 5,103,486 A | | 4/1992 | Grippi |
| 5,229,764 A | * | 7/1993 | Matchett et al. ............. 340/5.52 |
| 5,247,137 A | | 9/1993 | Epperson |
| 5,263,742 A | | 11/1993 | Koch |
| 5,353,350 A | | 10/1994 | Unsworth et al. |
| 5,539,665 A | | 7/1996 | Lamming et al. |
| 5,559,895 A | | 9/1996 | Lee et al. |
| 5,619,025 A | | 4/1997 | Hickman et al. |
| 5,623,552 A | | 4/1997 | Lane |
| 5,652,412 A | | 7/1997 | Lazzouni et al. |
| 5,677,955 A | | 10/1997 | Doggett et al. |
| 5,680,470 A | | 10/1997 | Moussa et al. |
| 5,682,247 A | | 10/1997 | Webster et al. |
| 5,706,349 A | | 1/1998 | Aditham et al. |
| 5,709,746 A | | 1/1998 | Ballard |
| 5,767,496 A | * | 6/1998 | Swartz et al. ............. 382/182 |
| 5,774,571 A | | 6/1998 | Marshall |
| 5,781,661 A | | 7/1998 | Hiraiwa et al. |
| 5,802,199 A | | 9/1998 | Pare, Jr. et al. |
| 5,805,719 A | | 9/1998 | Pare, Jr. et al. |
| 5,834,748 A | | 11/1998 | Litman |
| 5,838,306 A | | 11/1998 | O'Connor et al. |
| 5,848,321 A | | 12/1998 | Roh et al. |

(Continued)

FOREIGN PATENT DOCUMENTS

WO PCT/US97/08090 11/1997
WO PCT/US99/07900 4/1999

(Continued)

Primary Examiner — Manav Seth
(74) Attorney, Agent, or Firm — MacCord Mason PLLC

(57) ABSTRACT

A data security system comprises a host processor, and a plurality of remote computers. Each remote computer provides biometric authentication of a user prior to responding to the user request for data access. The remote computers are handheld when in operational mode. A sensor in the handheld computer captures a biometric image while the remote computer is being used. The biometric sensor is positioned in such a way that the sensor enables the capture of the biometric image continually during computer usage with each request for access to secure data. The biometric authentication occurs in a seamless manner and is incidental to the data request enabling user identity authentication with each request to access secure data.

18 Claims, 18 Drawing Sheets

Related U.S. Application Data 7,047,419, and a continuation-in-part of application No. PCT/US01/21038, filed on Jul. 5, 2001, and a continuation-in-part of application No. 09/865,756, filed on May 25, 2001, now Pat. No. 6,970,583, and a continuation-in-part of application No. 09/865,638, filed on May 25, 2001, now Pat. No. 6,925,565, and a continuation-in-part of application No. PCT/US00/19652, filed on Jul. 18, 2000, and a continuation-in-part of application No. 09/535,411, filed on Mar. 24, 2000, now Pat. No. 6,539,101, and a continuation-in-part of application No. 09/490,687, filed on Jan. 24, 2000, now Pat. No. 6,307,956.

(60) Provisional application No. 60/317,866, filed on Sep. 10, 2001, provisional application No. 60/313,084, filed on Aug. 18, 2001, provisional application No. 60/308,010, filed on Jul. 26, 2001, provisional application No. 60/303,946, filed on Jul. 9, 2001, provisional application No. 60/299,226, filed on Jun. 19, 2001, provisional application No. 60/286,177, filed on Apr. 24, 2001, provisional application No. 60/281,354, filed on Apr. 4, 2001, provisional application No. 60/217,151, filed on Jul. 9, 2000, provisional application No. 60/207,892, filed on May 25, 2000, provisional application No. 60/177,390, filed on Jan. 24, 2000, provisional application No. 60/163,433, filed on Nov. 3, 1999, provisional application No. 60/154,590, filed on Sep. 17, 1999.

U.S. PATENT DOCUMENTS

| Patent No. | Date | Inventor | Ref |
|---|---|---|---|
| 5,857,152 A | 1/1999 | Everett | |
| 5,859,420 A | 1/1999 | Borza | |
| 5,862,247 A | 1/1999 | Fisun et al. | |
| 5,869,791 A | 2/1999 | Young | |
| 5,872,834 A | 2/1999 | Teitelbaum | |
| 5,892,824 A | 4/1999 | Beatson et al. | |
| 5,903,225 A | 5/1999 | Schmitt et al. | |
| 5,973,731 A | 10/1999 | Schwab | |
| 5,982,891 A | 11/1999 | Ginter et al. | |
| 5,991,431 A | 11/1999 | Borza et al. | |
| 6,035,403 A | 3/2000 | Subbiah | |
| 6,038,666 A | 3/2000 | Hsu et al. | |
| 6,041,410 A | 3/2000 | Hsu et al. | |
| 6,064,751 A | 5/2000 | Smithies et al. | |
| 6,076,167 A | 6/2000 | Borza | |
| 6,088,585 A * | 7/2000 | Schmitt et al. | 455/411 |
| 6,128,602 A | 10/2000 | Northington et al. | |
| 6,140,939 A | 10/2000 | Flick | |
| 6,141,436 A * | 10/2000 | Srey et al. | 382/124 |
| 6,164,528 A | 12/2000 | Hills et al. | |
| 6,175,922 B1 | 1/2001 | Wang | |
| 6,181,803 B1 * | 1/2001 | Davis | 382/115 |
| 6,182,221 B1 | 1/2001 | Hsu et al. | |
| 6,193,152 B1 | 2/2001 | Fernando et al. | |
| 6,193,153 B1 | 2/2001 | Lambert | |
| 6,202,055 B1 | 3/2001 | Houvener et al. | |
| 6,219,793 B1 | 4/2001 | Li et al. | |
| 6,237,786 B1 | 5/2001 | Ginter et al. | |
| 6,256,737 B1 | 7/2001 | Bianco et al. | |
| 6,307,956 B1 | 10/2001 | Black | |
| 6,308,887 B1 * | 10/2001 | Korman et al. | 235/379 |
| 6,317,544 B1 * | 11/2001 | Diehl et al. | 385/115 |
| 6,539,101 B1 | 3/2003 | Black | |
| 6,549,756 B1 | 4/2003 | Engstrom | |
| 6,572,014 B1 | 6/2003 | Lambert | |
| 6,728,881 B1 | 4/2004 | Karamchetty | |
| 6,810,480 B1 | 10/2004 | Parker | |
| 6,925,565 B2 | 8/2005 | Black | |
| 6,938,159 B1 | 8/2005 | O'Connor et al. | |
| 6,948,066 B2 | 9/2005 | Hind et al. | |
| 6,968,453 B2 | 11/2005 | Doyle et al. | |
| 6,970,583 B2 | 11/2005 | Black | |
| 6,976,032 B1 | 12/2005 | Hull et al. | |
| 7,047,419 B2 | 5/2006 | Black | |
| 7,082,213 B2 | 7/2006 | Black | |
| 7,349,871 B2 | 3/2008 | Labrou et al. | |
| 2002/0026419 A1 | 2/2002 | Maritzen et al. | |

FOREIGN PATENT DOCUMENTS

| | | |
|---|---|---|
| WO | PCT/US00/19652 | 7/2000 |
| WO | PCT/US01/21038 | 7/2001 |
| WO | PCT/US02/16879 | 5/2002 |

* cited by examiner

COMPUTER NETWORK

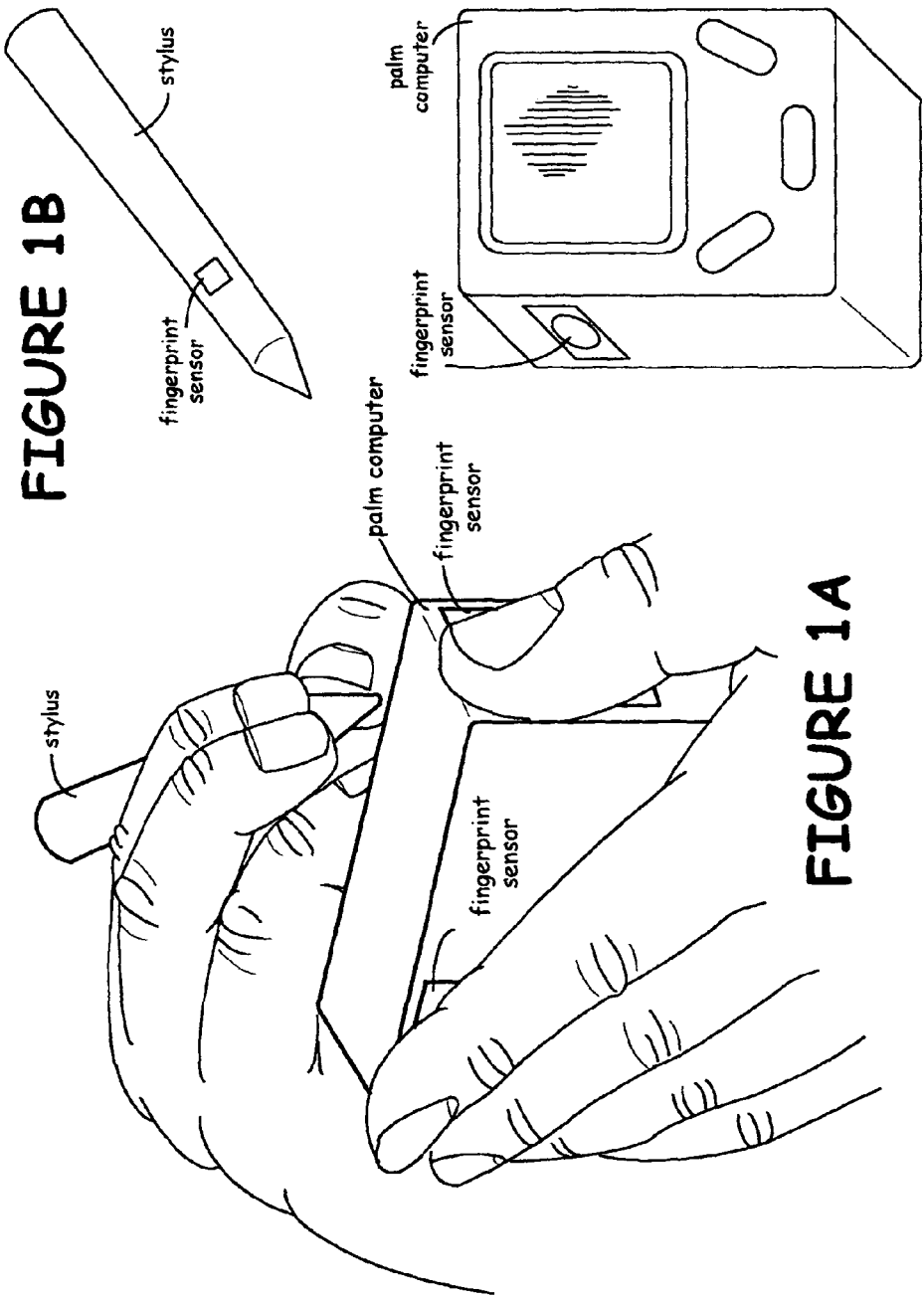

back side front side

Registration Request

Logon Request
without access to network data

Network Access Request

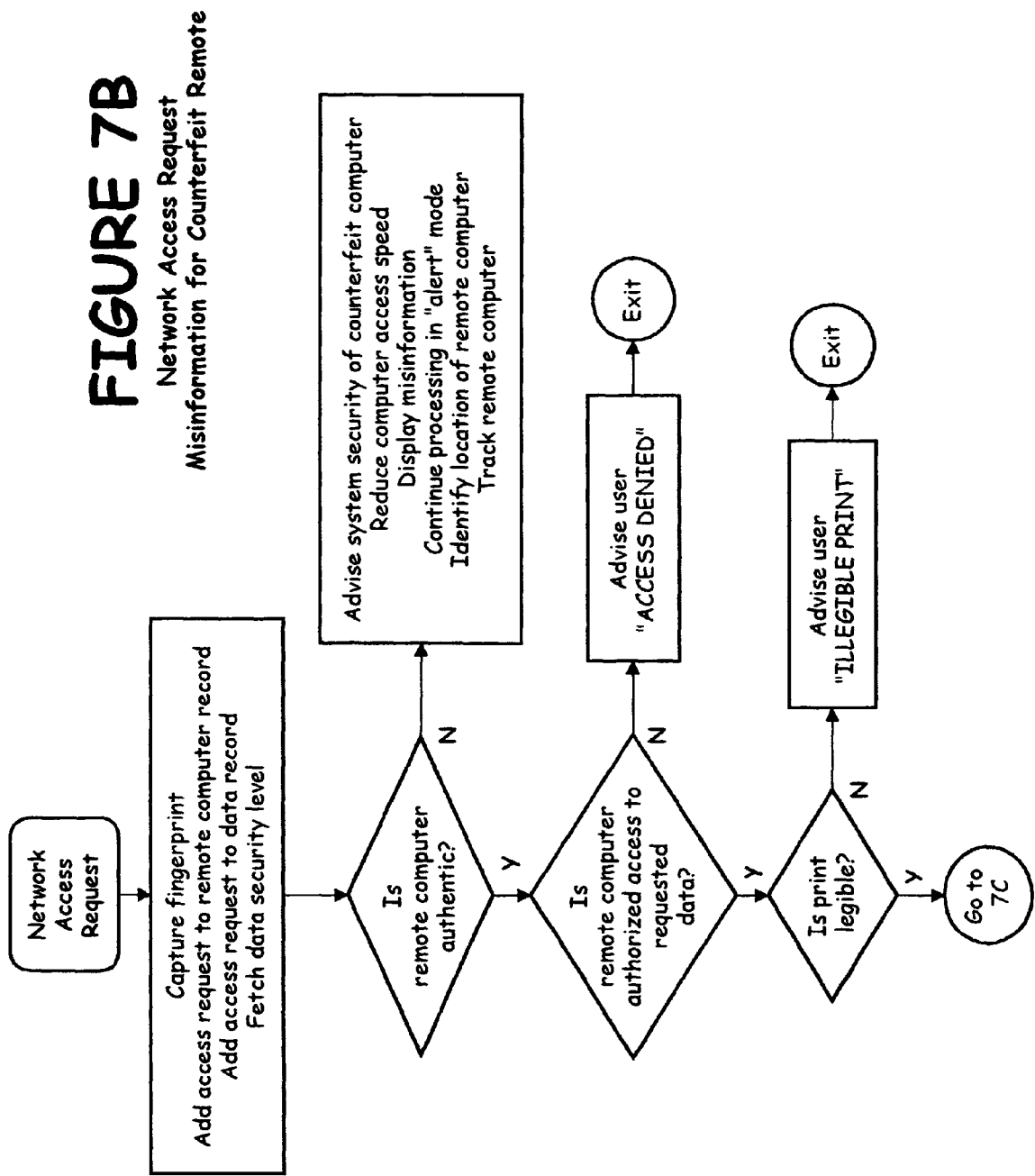

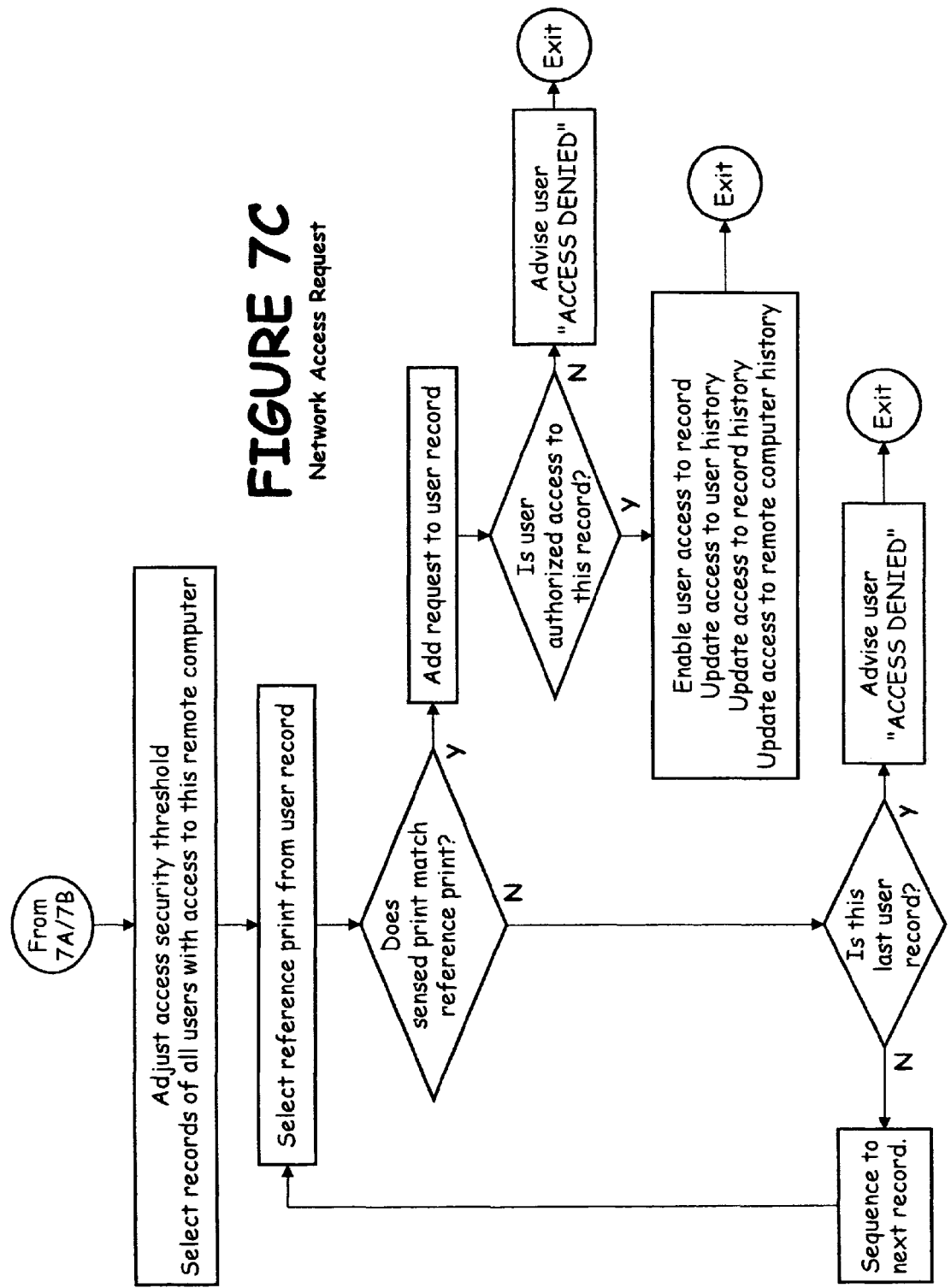

Network Data Entry Request

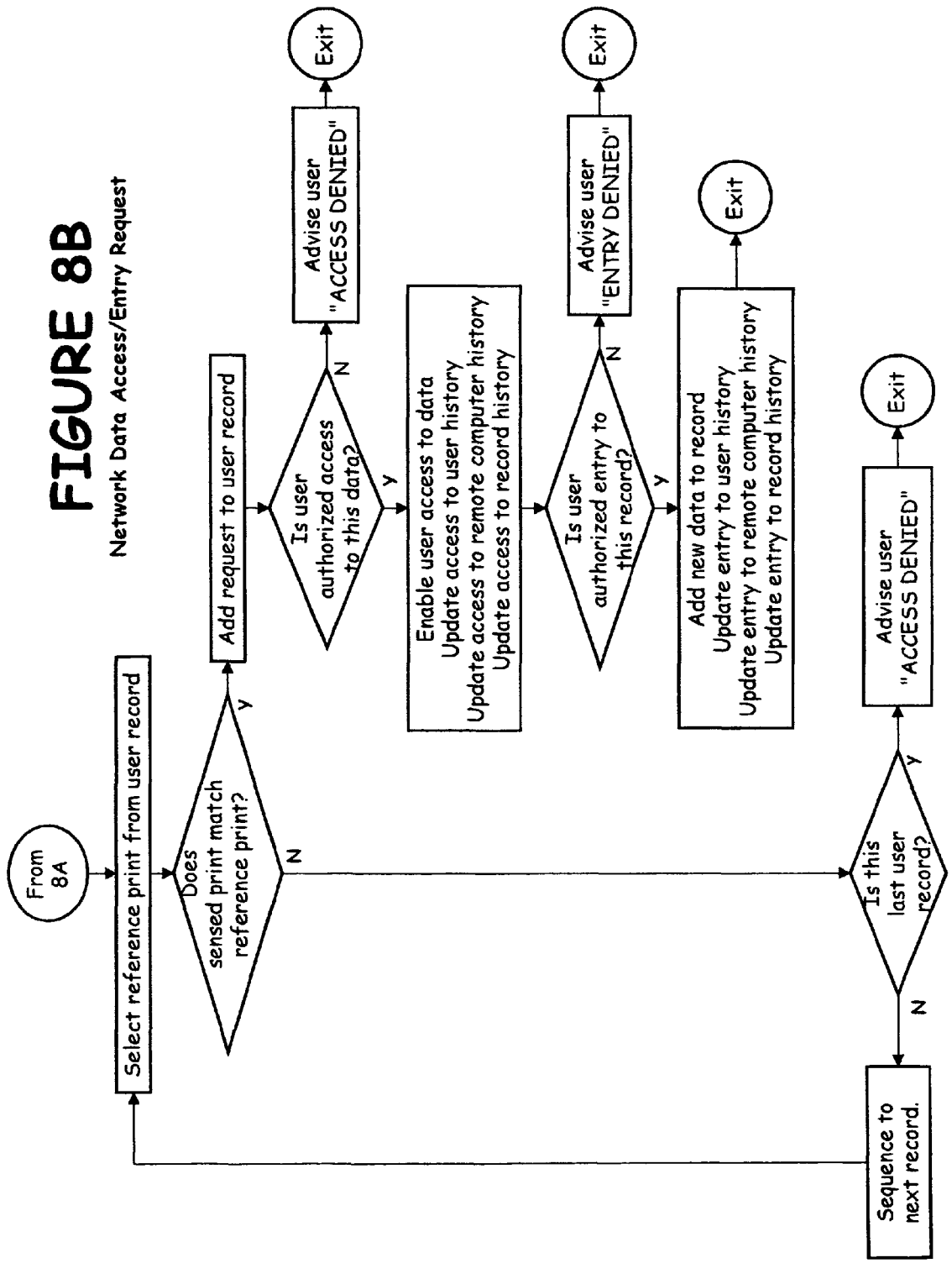

Network High Security Request

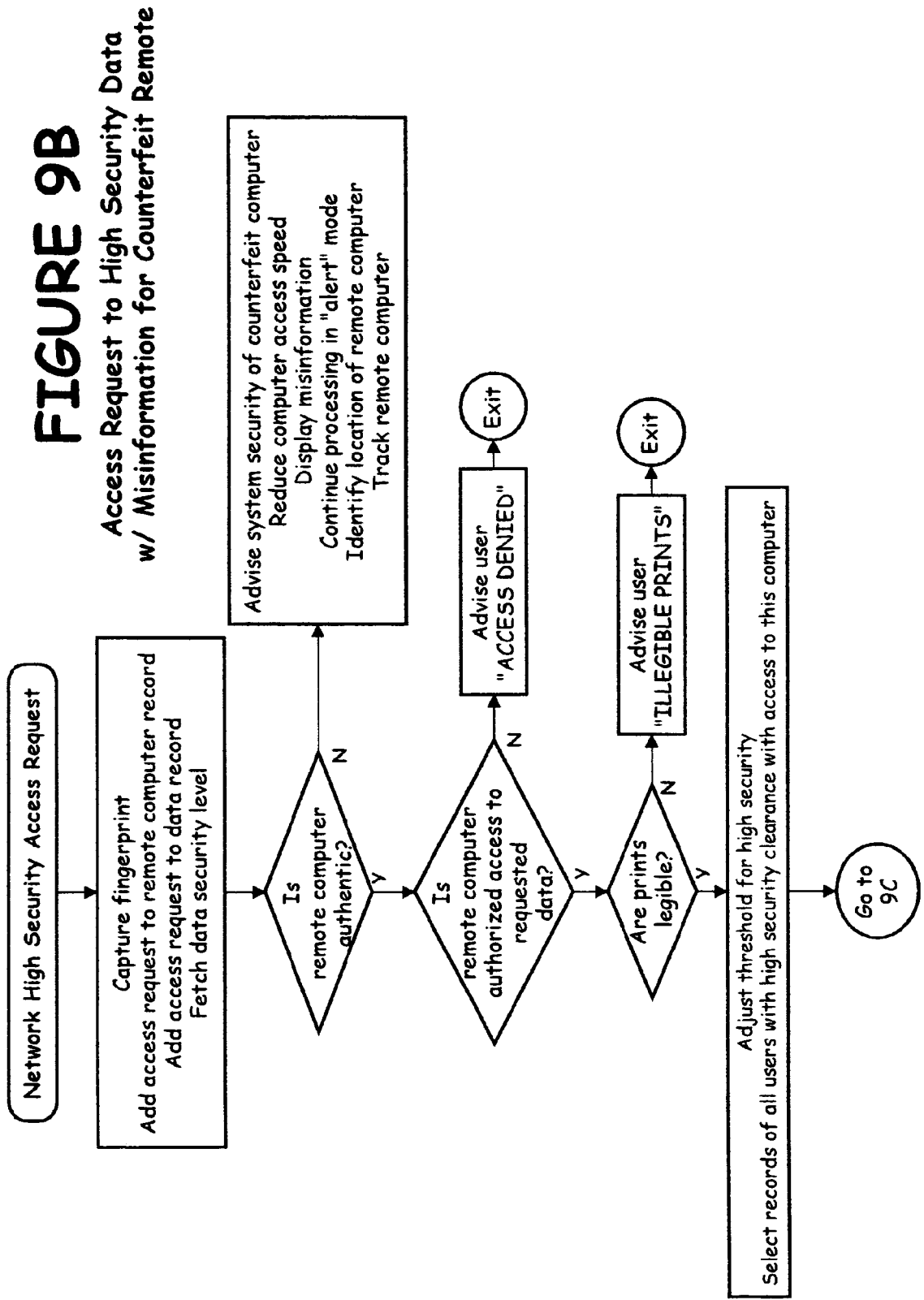

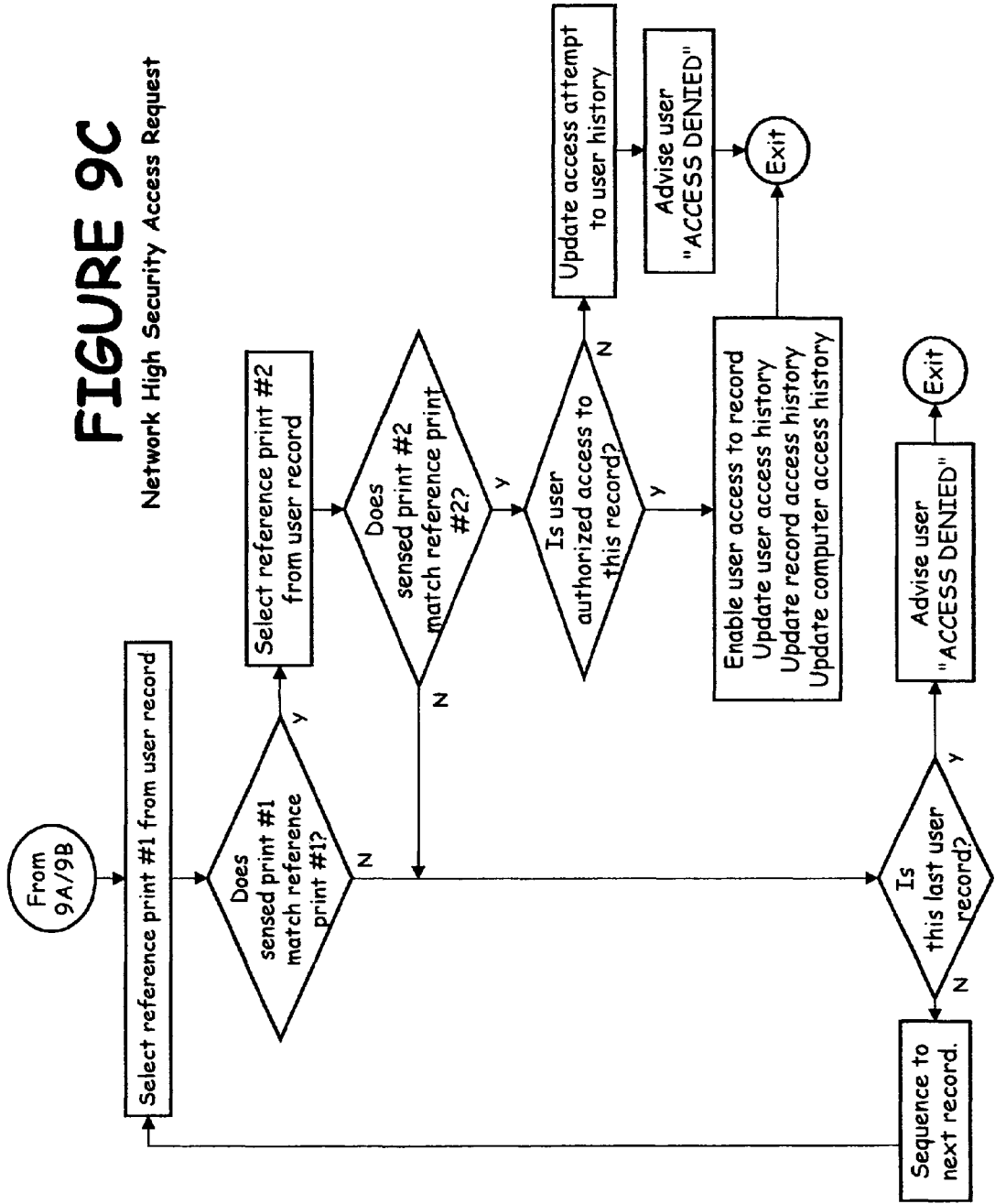

```
USER NAME
USER ADDRESS
USER REFERENCE PRINTS AND SIGNATURE
USER SECURITY LEVEL
LIST OF DATA RECORDS AUTHORIZED TO ACCESS
LIST OF AUTHORIZED REMOTE COMPUTERS
HISTORY OF RECORDS ACCESSED & WHEN
LIST OF RECORDS DENIED ACCESS TO & WHEN
```

FIGURE 10A
USER RECORD

```
DATA RECORD NUMBER
DATA SECURITY LEVEL
NAMES OF AUTHORIZED USERS
REFERENCE PRINTS OF AUTHORIZED USERS
LIST OF AUTHORIZED REMOTE COMPUTERS
HISTORY OF PERSONS ACCESSING THIS RECORD & WHEN
HISTORY OF PERSONS DENIED ACCESS
```

FIGURE 10B
DATA ACCESS RECORD

```
REMOTE COMPUTER NUMBER
NAMES OF AUTHORIZED USERS
REFERENCE PRINTS OF AUTHORIZED USERS
LIST OF AUTHORIZED RECORDS
PERSONS AUTHORIZED TO ACCESS EACH RECORD
HISTORY OF PERSONS USING THIS COMPUTER
HISTORY OF USERS DENIED ACCESS
PRINTS OF USERS DENIED ACCESS
```

FIGURE 10C
REMOTE COMPUTER RECORD

Network Security Audit

REGULAR SECURITY

HIGH SECURITY

DATA SECURITY SYSTEM

BACKGROUND OF THE INVENTION

CROSS-REFERENCE TO RELATED APPLICATION

This application is a continuation of application Ser. No. 12/857,819 entitled "Data Security System" filed on Oct. 25, 2010, which is a continuation of application Ser. No. 11/124,016 entitled "Data Security System" filed on Aug. 8, 2005, now U.S. Pat. No. 7,822,232 which is a divisional of U.S. patent application Ser. No. 10/032,591 entitled "Data Security System" filed on Oct. 28, 2001, now U.S. Pat. No. 7,047,419 B2 issued May 16, 2006, which is a continuation-in-part of the following U.S. Provisional, Non-provisional And PCT Applications in the name of the same inventors, not assigned as are the previous applications, hereby incorporated by reference as if fully set forth herein:

U.S. Provisional Application No. 60/317,866 entitled "Fingerprint-Based Security System" filed on Sep. 10, 2001;

U.S. Provisional Application No. 60/313,084 entitled "Fingerprint Sensing-Multiple Images" filed on Aug. 18, 2001;

U.S. Provisional Application No. 60/308,010 entitled "Transponder-Based Security System" filed on Jul. 26, 2001;

U.S. Provisional Application No. 60/303,946 entitled "Authenticated Commercial Transaction System" filed on Jul. 9, 2001;

PCT Application No. PCT/US01/21,038 entitled "Data security system" filed on Jul. 5, 2001;

U.S. Provisional Application No. 60/299,226 entitled "Pen-Based Transponder Identity Verification System" filed on Jun. 19, 2001;

U.S. patent application Ser. No. 09/865,756 entitled "Identity Authentication Device" filed on May 25, 2001; now U.S. Pat. No. 6,970,583

U.S. patent application Ser. No. 09/865,638 entitled "Pen-Based Transponder Identity Verification System" filed on May 25, 2001; now U.S. Pat. No. 6,925,565

U.S. Provisional Application No. 60/286,177 entitled "Pen-Based Identity Verification System" filed on Apr. 24, 2001;

U.S. Provisional Application No. 60/281,354 entitled "Pen-Based and Card-Based Identity Verification System" filed on Apr. 4, 2001;

PCT Application No. PCT/US00/19,652 entitled "Identity Authentication System and Method" filed on Jul. 18, 2000;

U.S. Provisional Application No. 60/217,151 entitled "Identity Authentication Device" filed on Jul. 9, 2000;

U.S. Provisional Application No. 60/207,892 entitled "Identity Authentication System and Method" filed on May 25, 2000;

U.S. patent application Ser. No. 09/535,411 entitled "Method for Identity Verification" filed on Mar. 24, 2000; now U.S. Pat. No. 6,539,101

U.S. patent application Ser. No. 09/490,687 entitled "Writing Implement for Identity Verification System" filed on Jan. 24, 2000; now U.S. Pat. No. 6,307,956

U.S. Provisional Application No. 60/177,390 entitled "Writing Implement for Identity Verification System" filed on Jan. 24, 2000;

U.S. Provisional Application No. 60/163,433 entitled "Writing Implement for Identity Verification System" filed on Nov. 3, 1999; and U.S. Provisional Application No. 60/154,590 entitled "Writing Implement for Identification Verification System" filed on Sep. 17, 1999.

FIELD OF THE INVENTION

The present invention relates to a data security system with identity authentication, and more particularly, to such authentication by biometric capture as access to data from a remote computer to a host processor is being processed.

The global workforce is increasingly mobile and handheld computing is on the rise. Smart handheld processors are emerging from the realm of individual purchases to enterprise deployment as they become key tools for connectivity to the corporate environment. Development of handheld applications and wireless technology tailored for a specific enterprise represent are serving the increasing mobile worker population. Handheld computer systems are ideal for applications that require: (1) highly portable devices—that are no longer constrained by a keyboard; (2) intuitive features—that resemble an environment familiar to the users; (3) improved efficiency, —that enables accurate data collection and manipulation; and (4) flexibility—that enables a wide variety of types of data entry.

By the year 2005 as much as 50 percent of all communication terminals will be mobile. These machines, while offering substantial storage capacity and computing power have only limited communication capabilities. As a result, users are gaining access to the powerful computing infrastructure.

Security is no longer an optional network component. Today organizations of all sizes are discovering the need to protect their networks from both external and internal unauthorized users. In the days before remote access, organizations had controlled, hard-wired networks, which provided a certain degree of physical security. Network access was limited to users physically located in the building. Requiring users to type in a name and password, added another layer of security to the network. Providing remote network access has added an entirely new dimension to network access and system integrity.

U.S. Pat. No. 5,838,306 (O'Connor, et al.) discloses a mouse with a security feature. The mouse computer input peripheral device includes a window area integrally constructed within the mouse and positioned at an area on the mouse upon which a user normally places a finger in operating the mouse. U.S. Pat. No. 5,991,413 (Borza, et al.) discloses a mouse adapted to scan fingerprint data. In an attempt to address these concerns, a biometric pointing device such as a mouse is presented incorporating therein a contact imager. The contact imager fits within a small enclosure. Further, data transmission means within the mouse provides a signal to a single port on a computer indicative of the output data from both the contact imaging means and the pointing device. Also, PCT Application No. PCT/US99/17900 entitled "Identification Confirmation System" filed on Apr. 7, 1999; U.S. patent application Ser. No. 09/490,687, entitled "Writing Implement and Data security systems" filed on Jan. 24, 2000; U.S. patent application Ser. No. 09/535,411, entitled "Method for Identity Verification" filed on Mar. 20, 2000; and PCT Application No. PCT/US00/19652 entitled "Identity Authentication System and Method" filed Jul. 18, 2000 by this applicant disclose the use of fingerprint sensors disposed in the barrel of a stylus used to generate an electronic signature as the preferred digital signature.

In addition, Polaroid has introduced a tow-cost finger image scanner, targeting users with concerns for desktop security concerns and for personal security in e-commerce. The new finger image scanner is built into keyboards. Compaq Computer also markets a keypad with a fingerprint scanner. White connected to systems and retrieving or transmitting data, security is critical. Secure connections may not be necessary when browsing the news, for example, but is needed when connected to networks.

What is needed is a data security system wherein data resources are available only to authorized users and only after the user's identity has been confirmed such that the user cannot deny the communication. What is needed is a data security system and system components that authenticate identity for each entry or access to data; that authenticate identity on a continual basis with each request, and provide such authentication in a seamless and incidental manner without the necessity of extra hand or finger movements; and that are secure and discourage hackers.

SUMMARY OF THE INVENTION

The data security system of the present invention addresses these needs and dramatically improves the nature data access for handheld computers. The preferred embodiment of the data security system of the present invention comprises a host processor, and a plurality of remote computers. Each computer provides advanced biometric authentication of a user prior to responding to the user request for data access. The remote computers are handheld when in operational mode. A sensor in the computer casing captures a print of a finger or hand of the user white the computer is being held. The biometric sensor is positioned in such a way that the sensor remains in continual contact with the hand of the user enabling a continual authentication of the identity of the user with each request for access to a secure record. The biometric sensor is preferably a fingerprint sensor. The fingerprint authentication is captured in an incidental manner as the data request is submitted from the handheld computer to the host processor enabling user identity authentication simultaneously with each request to access the secure record.

These handheld processors maintain continual contact with a finger, thumb, or palm of the user so that biometric authentication can be accomplished without the need to press special surfaces or otherwise alter conventional computer manipulations. The authentication process is seamless to the computer user.

In the data security system of the present invention, a palm or pocket computer the size of the user's hand is used that can conveniently be held in one's hand. One or more fingerprint sensors are disposed in the back or side surfaces of the handheld computer such that the identity of the user is continually verified white the computer is being held and used. The ability to provide continual verification by means of biometric print sensors is particularly important to ensure network security.

While fingerprints and palm prints are used in this application for purposes of illustration, it is understood that the principles of this invention are also applicable to other biometric technologies where identity can be confirmed when the user touches a sensor, such as cell capture and DNA. Also, while the technology of the present invention applies to all portable computers (e.g.—laptops, handhelds, palms, and pockets), the technology is preferably directed at palm and pocket computers.

For purposes herein, a list of key terms is hereafter set forth to clarify the scope of this specification. A "handheld computer" refers to any computing device, including, but not limited to, a pocket computer; a palm-type computer; a Laptop computer; a cell-phone; and similar devices, that involve a visual display of textual data to the computer user. A "remote computer" refers to a hard-wired or wireless handheld computer. "Casing" refers to either the housing of the handheld computer or a pocket or container for storing the handheld computer.

"Biometrics" refers to the technology of verifying the identity of an individual by measuring and analyzing data relative to a physiological characteristic or behavioral characteristic of an individual. Examples of physiological characteristics are retina, iris, hand geometry, body odor, and fingerprint; and examples of behavioral biometrics are voice, keystroke rhythm and signature. A "fingerprint" is a biometric and refers to either the print of the thumb, index finger, any other finger, or combination thereof. A "facial-image" biometric includes, but is not limited to facial geometry, facial thermal pattern, iris, and retina. A "hand-image" biometric includes, but is not limited to, a fingerprint, a thumbprint, a palm print, hand cell capture, DNA, and hand geometry.

For a more complete understanding of the data security system of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention. Throughout the description, like reference numbers refer to the same component throughout the several views.

BRIEF DESCRIPTION OF THE DRAWINGS

FIG. 1A is a schematic the first preferred embodiment of the backside of a computing device of the present invention for use with the data security system of FIG. 1, the computing device enabling biometric authentication prior to accessing network data, the computing device being handheld and portable, the handheld computer being pen-based, the handheld computer comprising a stylus for operating such computing device, the computer being remote from a host processor and enabling access to network data, the computer including a pair of fingerprint sensors embedded in the casing of the handheld computer, one fingerprint sensor capturing a print image of the user's thumb and the second fingerprint image capturing a print image of the user's index finger, both being of the user's left hand;

FIG. 1B discloses the stylus of FIG. 1A, the stylus including a fingerprint sensor in the stylus barrel for enabling capture of a fingerprint image when the stylus is grasped;

FIG. 1C discloses the front-side of the handheld computer of FIG. 1A, the handheld computer including a fingerprint sensor embedded into the casing of the handheld computer at a site such that the image of the thumb of the user is captured during usage of the handheld computer;

FIGS. 7A and 7C disclose a simplified logic diagram of one preferred embodiment for requesting access to medium security data for the data security system of FIG. 1;

FIGS. 7B and 7C disclose a simplified logic diagram of another preferred embodiment for requesting access to medium security data for the data security system of FIG. 1, the system supplying the user with misinformation if the remote computer is counterfeit;

FIGS. 8A and 8B disclose a simplified logic diagram of one preferred embodiment for accessing data and data entry to the data security system of the FIG. 1;

FIGS. 9A and 9C disclose a simplified logic diagram of one preferred embodiment for requesting access to high security data of the data security system of FIG. 1, the high security data access request requiring a match authentication of a pair of user fingerprints;

FIGS. 9B and 9C disclose a simplified logic diagram of another preferred embodiment for requesting access to high security data for the data security system of FIG. 1, the system supplying the user with misinformation if the remote computer is counterfeit;

FIG. 10A discloses a simplified layout for a user record of one preferred embodiment of the data security system of FIG. 1;

FIG. 10B discloses a simplified layout for a data access record for the preferred embodiment of the data security system of FIG. 10A;

FIG. 10C discloses a simplified layout for a remote computer record for the preferred embodiment of the data security system of FIG. 10A;

DETAILED DESCRIPTION OF THE PREFERRED EMBODIMENTS

Figure 1:
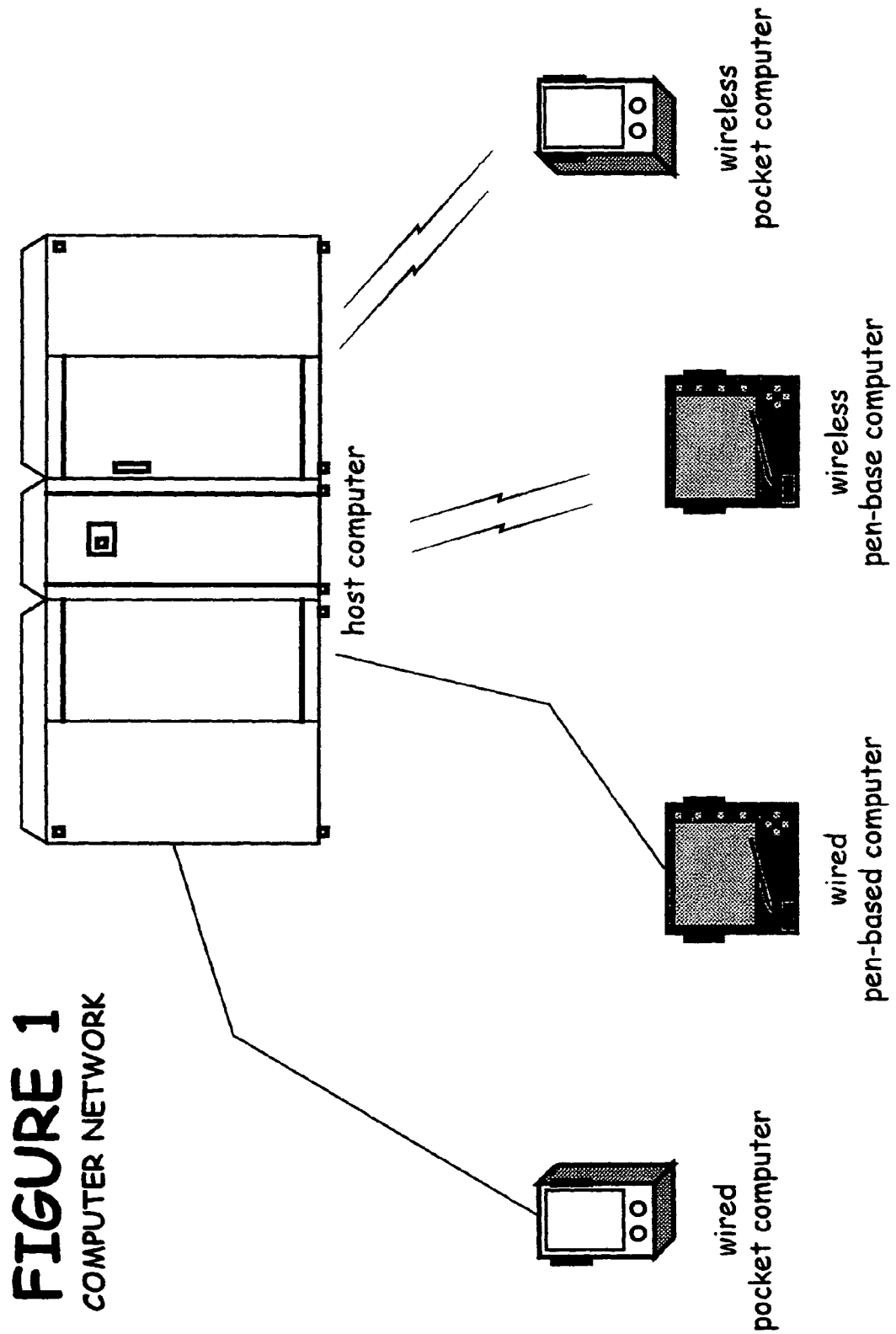
FIG. 1 is a schematic the preferred embodiment of the network system of the present invention.
Figure 2B:
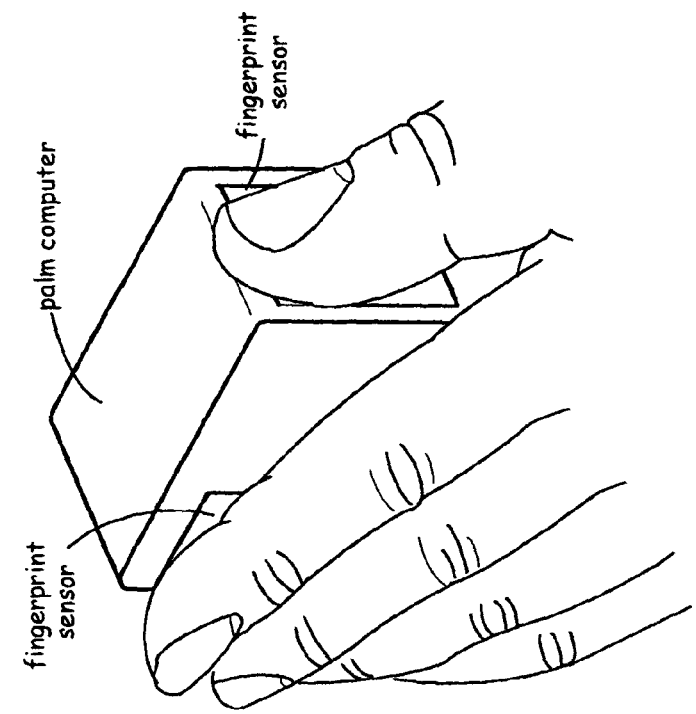
FIGS. 2A and 2B disclose a second preferred embodiment of the front-side and the backside respectively of the computing device of the present invention for use either with the data security system of FIG. 1 or as a stand alone unit with secure data therewithin, the computing device being handheld and portable, not necessarily pen-based and if pen-based with no fingerprint sensor in the stylus, the computing device being remote from a host processor and enabling access to network data, the computing device including a pair of fingerprint sensors embedded in the casing, one fingerprint sensor capturing a print image of the user's thumb and the second fingerprint image capturing a print image of the user's index finger, both being of the user's left hand.
Figure 2A:
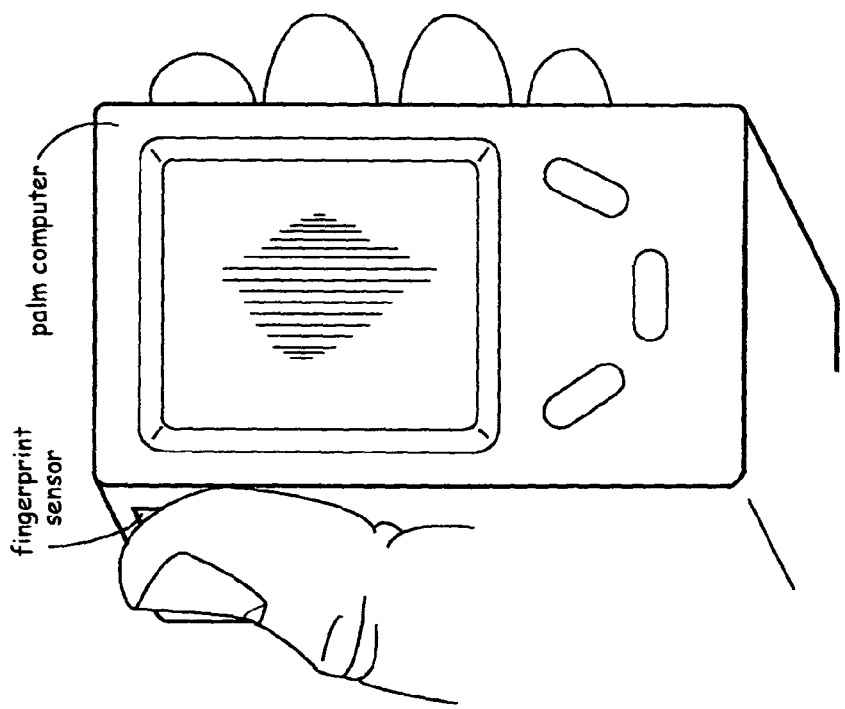

Referring now to the drawings, FIG. 1 discloses the preferred embodiment of the data security system of the present invention. The data security system comprises a host processor (12) and a plurality of computing devices (30A, 30B, 30C, and 30D). The host computer (12) includes confidential data that is to be accessed only by authorized users. Some of the computing devices are wireless and remote from the host computer (30C and 30D). The wireless computing devices are portable and handheld—and may be pen-based as shown in FIGS. 1A, 1B, and 1C, or not pen-based as shown in FIGS. 2A and 2B.

The computing device includes a sensor for capture of a user biometric image—preferably a fingerprint sensor (15). The fingerprint captures an image of a user's finger prior to each request to access data—guarding against unauthorized access to network data (a network security breach). The fingerprint image sensor (15) can also be captured prior to each request to enter new data to prevent contamination of network data.

The capture of the user biometric image is available at continual intervals during routine computer usage. Preferably, the image is captured and compared against a system reference image prior to each request for data access. In another embodiment, the capture occurs continually during predetermined intervals independent of any data access or entry requests. The continual monitoring of user identity provides an added layer of system security.

The capture of the user biometric image is incidental to routine computer usage. The biometric authentication is seamless, as the computer user need only hold the handheld computer is his/her hand similar to holding a conventional handheld computer. The capture of the biometric image is incidental manner to computer operation.

As shown in FIGS. 2A and 2B, at least one fingerprint sensor (15) is positioned at one or more strategic sites such that a portion of the hand of the user is in continuous contact therewith during usage of the processor, enabling a continual authentication of the identity of the user with each request for access to each secure record. The fingerprint authentication is captured in an incidental manner as the data request is submitted from the handheld computer to the host processor enabling user identity authentication simultaneously with each request to access the secure record. As shown, the processor includes sensors to capture a thumbprint, the print of the index finger, and a palm print. Also, a palm print sensor can be disposed on the back surface of the computing device of the present invention to supplement or complement the fingerprint sensors. Multiple sensors are recommended for high-security applications (see for example FIGS. 9A and 9B).

Figure 3B:
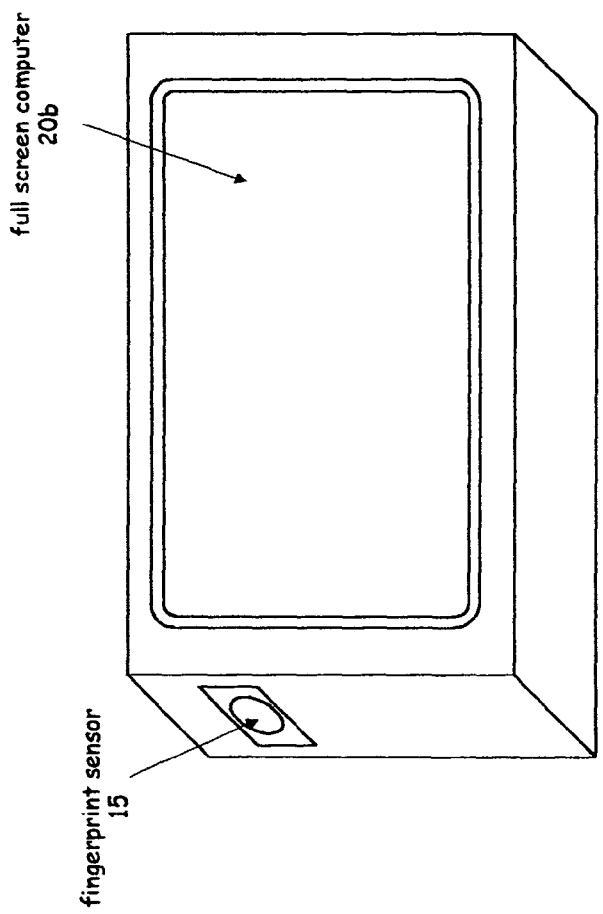
FIG. 3B discloses yet another preferred embodiment of a computing device for use in the data security system of FIG. 1, the processor device being a full screen computer, the processor device having a fingerprint sensor disposed on a side of the full-screen computer.
Figure 3A:
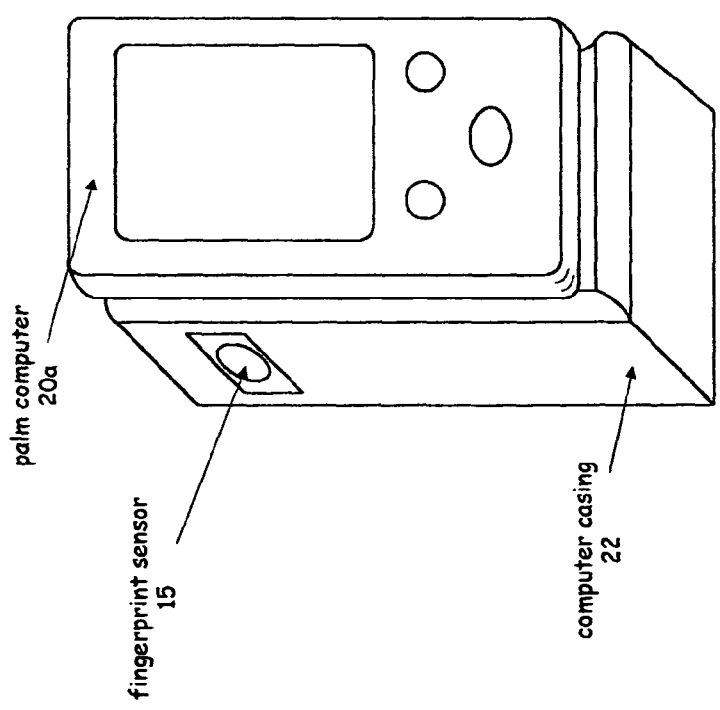
FIG. 3A discloses another preferred embodiment of a computing device for use with the data security system of FIG. 1, the handheld computer being mounted within a housing, a fingerprint sensor being positioned in a grip portion of the housing of the handheld computer.

FIG. 3A discloses the frontside of another embodiment of a processor device for use in another preferred embodiment of the data security system of the present invention. The fingerprint sensor (15) is positioned in the casing of a palm computer (20a), the casing being used to house the palm computer when used and stored. The casing may also be a wallet or pouch in digital engagement with the processor, either through wire or a wireless mode—enabling identity authentication whenever network access to data is required. The principle advantage of this approach is that registration is conducted through the casing and the computers need not be altered (off the shelf). FIG. 3B discloses yet another full-screen processor (20b) for use in the data security system of the present invention. These processors are sometimes referred to as handheld computers in the literature, but are referred to as full-screen processors herein for clarity. The screen is roughly the size of a screen of a PC, except that the computer does not have a conventional keypad. A fingerprint sensor is disposed on one side of the full-screen computer.

Figure 4B:
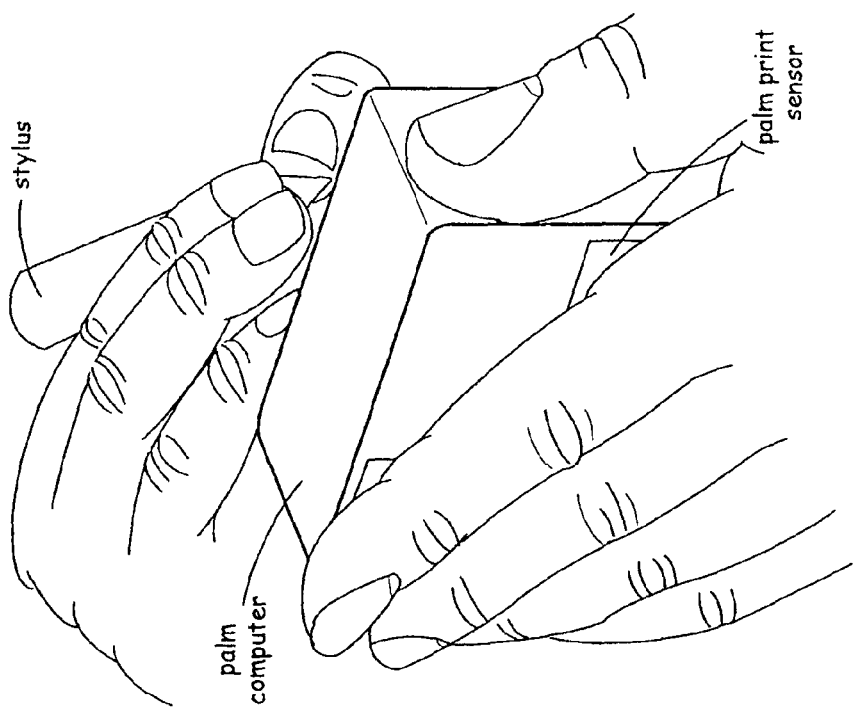
FIG. 4B discloses yet another preferred embodiment of a computing device for use in the data security system of FIG. 1, the processor device being a handheld computer, the processor device having a palm image sensor disposed on the backside of the handheld computer.
Figure 4A:
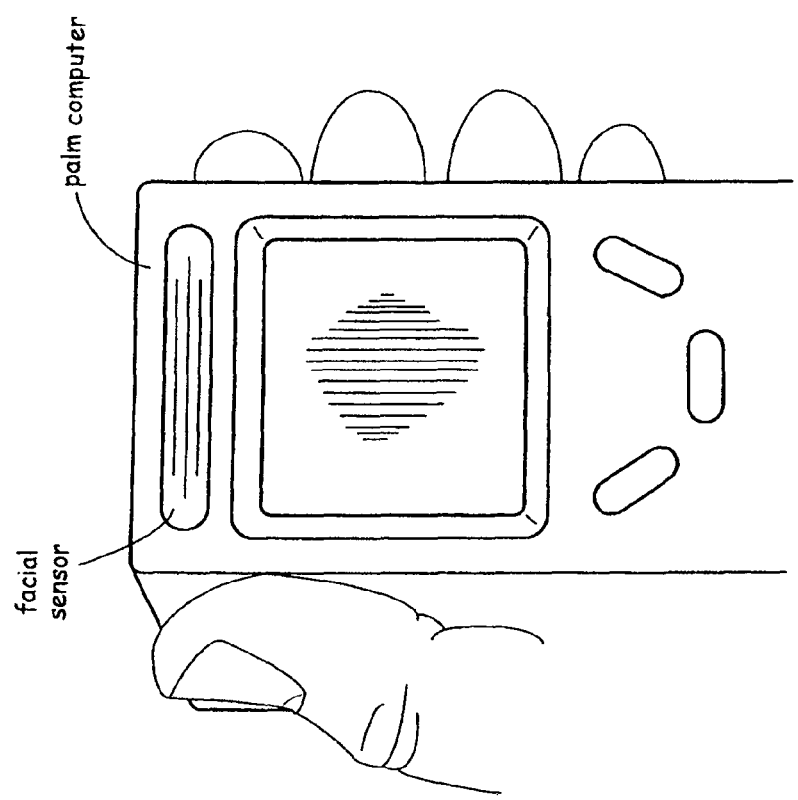
FIG. 4A discloses another preferred embodiment of a computing device for use in the data security system of FIG. 1, the processor device being a handheld computer, the handheld computer including a facial image biometric sensor that captures a facial biometric when data access is made from the handheld computer.

FIG. 4A discloses another preferred embodiment of a computing device for use in the data security system of the present invention. The handheld computing device includes a facial image biometric sensor (16) that captures a facial biometric when data access is made from the handheld computing device. FIG. 4B discloses yet another preferred embodiment of a computing device for use in the data security system of the present invention. The computing device is a handheld computer, having a palm image sensor (17) disposed on the backside thereof.

The strategic positioning of individual and multiple sensors depends on the size and shape of the individual computer, and the size of the hands of the computer user. And, it is advised that either the location of the sensors is symmetrical (both sides of the processor) to accommodate both left-handed and right-handed users. Alternatively, some processors can be designed for right-handed users and others for left-handed users.

Figure 5:
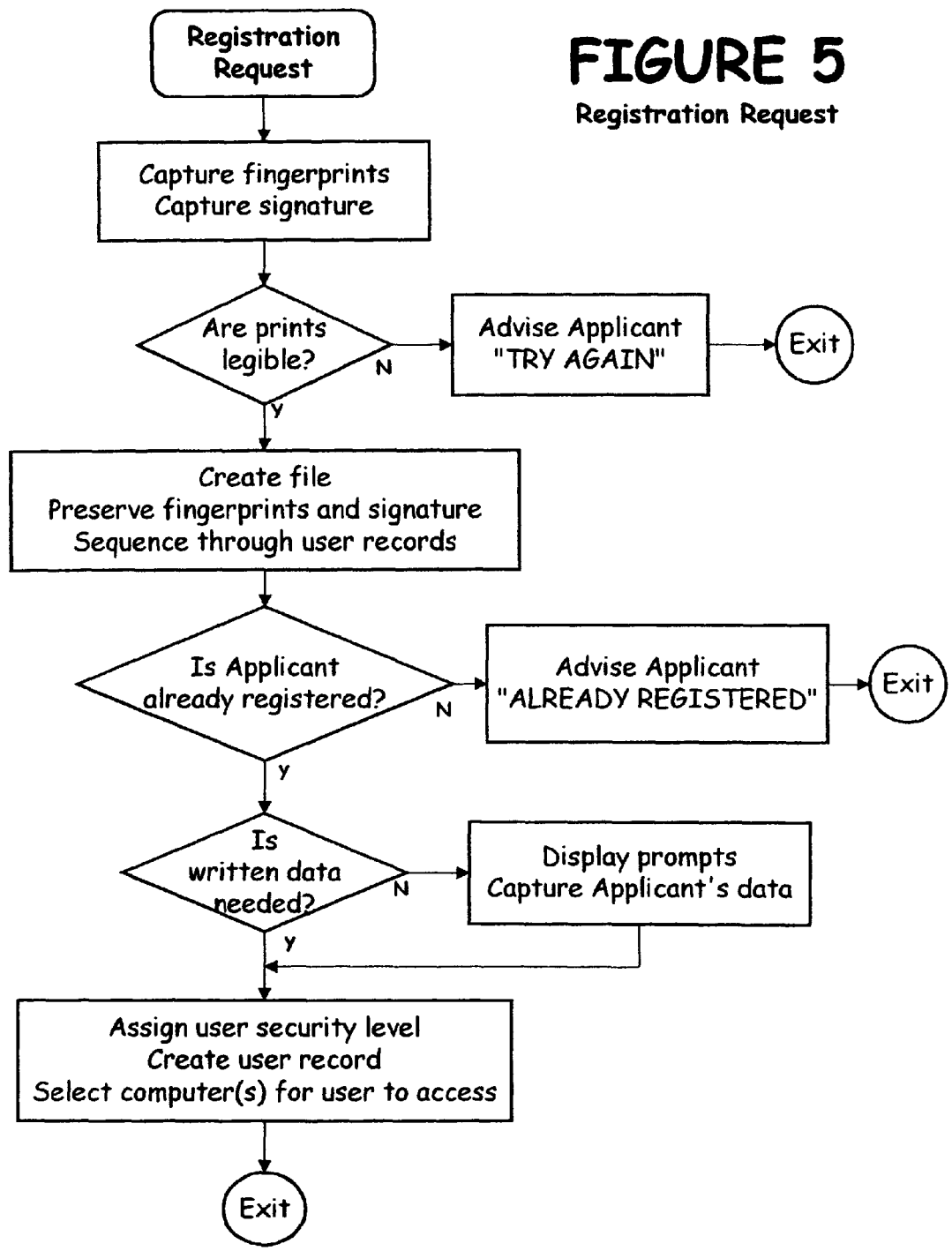
FIG. 5 discloses a simplified logic diagram of one embodiment for registering in the data security system of FIG. 1, a user file and reference biometrics being secured in a user file that is created during the registration process.

Referring now to FIG. 5, the user registers his or her prints by submitting the thumb, index finger, and/or palm prints to the network in a secure process. The reference print is preferably stored in the host processor for security purposes to prevent user access and tampering. The prints may need to be stored in the system also. Subsequently, when network access is requested, the relevant print or prints are captured and compared against the reference prints. Only upon authentication is network access enabled to authorized users. Data access is only enabled once a match has occurred that equals or exceeds a threshold value that has been set in accordance with the sensitivity of the data being requested access to. The system also enables varying levels of security within the same network since person A may be permitted access to certain data, and person B permitted access to other data. For example both are permitted access to general network data, but each is only permitted access to his/her own personal or employment or medical files.

For most lower security applications, one sensor is adequate. However, in many higher security applications, multiple prints may be appropriate, since processing occurs based upon only a partial print. The data security system of the present invention enables system designers to integrate into the system the level of security needed for each application, while allowing improved security to be incorporated as needed.

The data security system of the present invention continually controls network access and ensures the integrity of all data. The system enhances security without the need to modify the casing of the computer with card-readers or sensing devices. Identity is authenticated continually and routinely, each time there's a request to access additional information.

Figure 6:
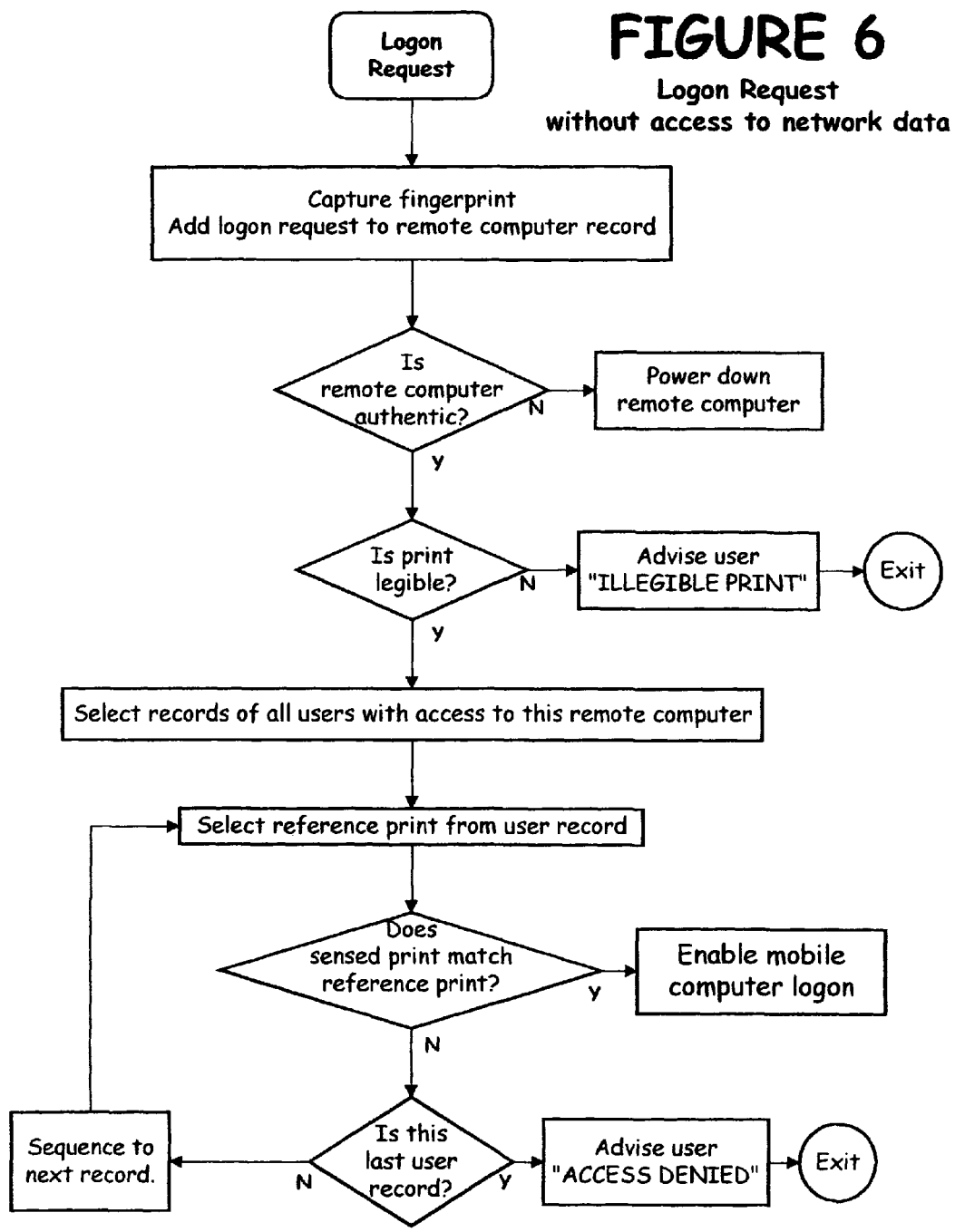
FIG. 6 discloses a simplified logic diagram of one embodiment for logging onto the data security system of FIG. 1, with access of the remote computer having access to the remote computer but being excluded from secure network data, a captured print being compared to a reference record for purposes of authentication.

The preferred embodiments of the data security system of the present invention requires authentication prior to each login; each request for data access; and each data entry. FIG. 6 discloses a simplified logic diagram of one embodiment for togging onto the data security system of the present invention.

A captured print is compared to a reference record for purposes of authentication. Since the network may include data that is not confidential (like Internet access), the user need only be authorized to access the handheld computer to gain system access—this is not recommended for high security networks.

Figure 7A:
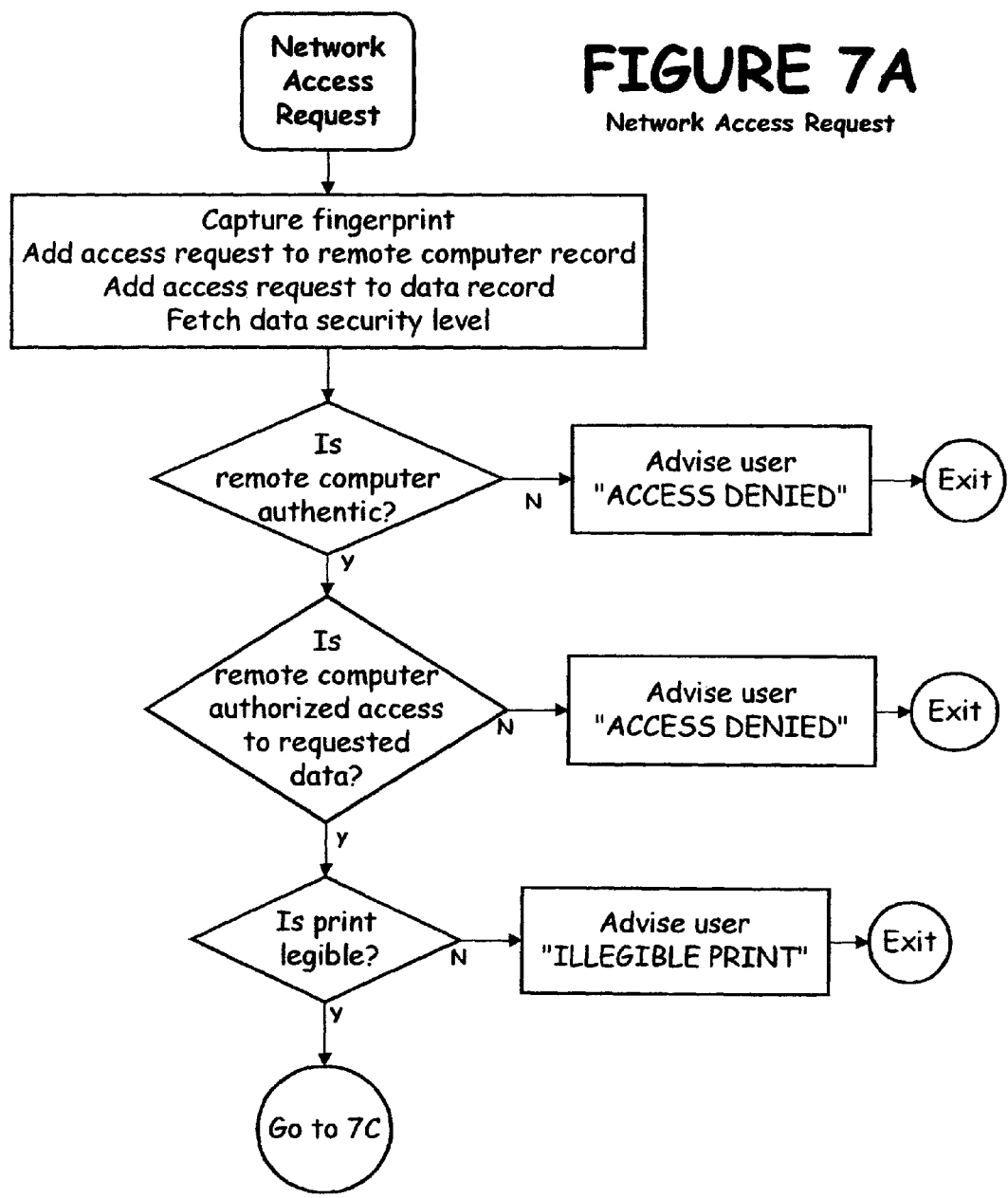

The preferred embodiments of the data security system of the present invention create a fingerprint-authenticated record of each user (data access and entry); of each record; and of each computer. FIGS. 7A and 7B disclose a simplified logic diagram of one preferred embodiment for requesting access to the data security system of the present invention.

Similarly, FIGS. 7B and 7C disclose a simplified logic diagram of another preferred embodiment for requesting access to medium security data for the data security system of the present invention, the system supplying the user with misinformation if the remote computer is counterfeit—a security breach. Immediately, network security is advised of the bogus request. The system determines whether to display misinformation or to block access from the remote terminal. The primary purpose for providing misinformation is either to try to locate the remote computer or identify the unauthorized person. If network security opts to block access, all available data is captured of the computer location and of the unauthorized remote computer prior to such blocking. If network security opts to operate in bogus mode, again—all data pertaining to the user and the computer location are captured. Immediately network access speed for the remote terminal is reduced. Then, a bogus welcome screen is displayed welcoming the computer user to the network. Prompts are provided to the terminal but precautions are taken to not provide any data that is proprietary—misinformation is substituted. System security has prepared in advance for bogus operation with various screens, misinformation, and routing planned for just such a security breach. This bogus mode continues as long as possible to enable collection of user and computer data. Similar provision system procedures can also be incorporated for a request for remote data entry.

Figure 8A:
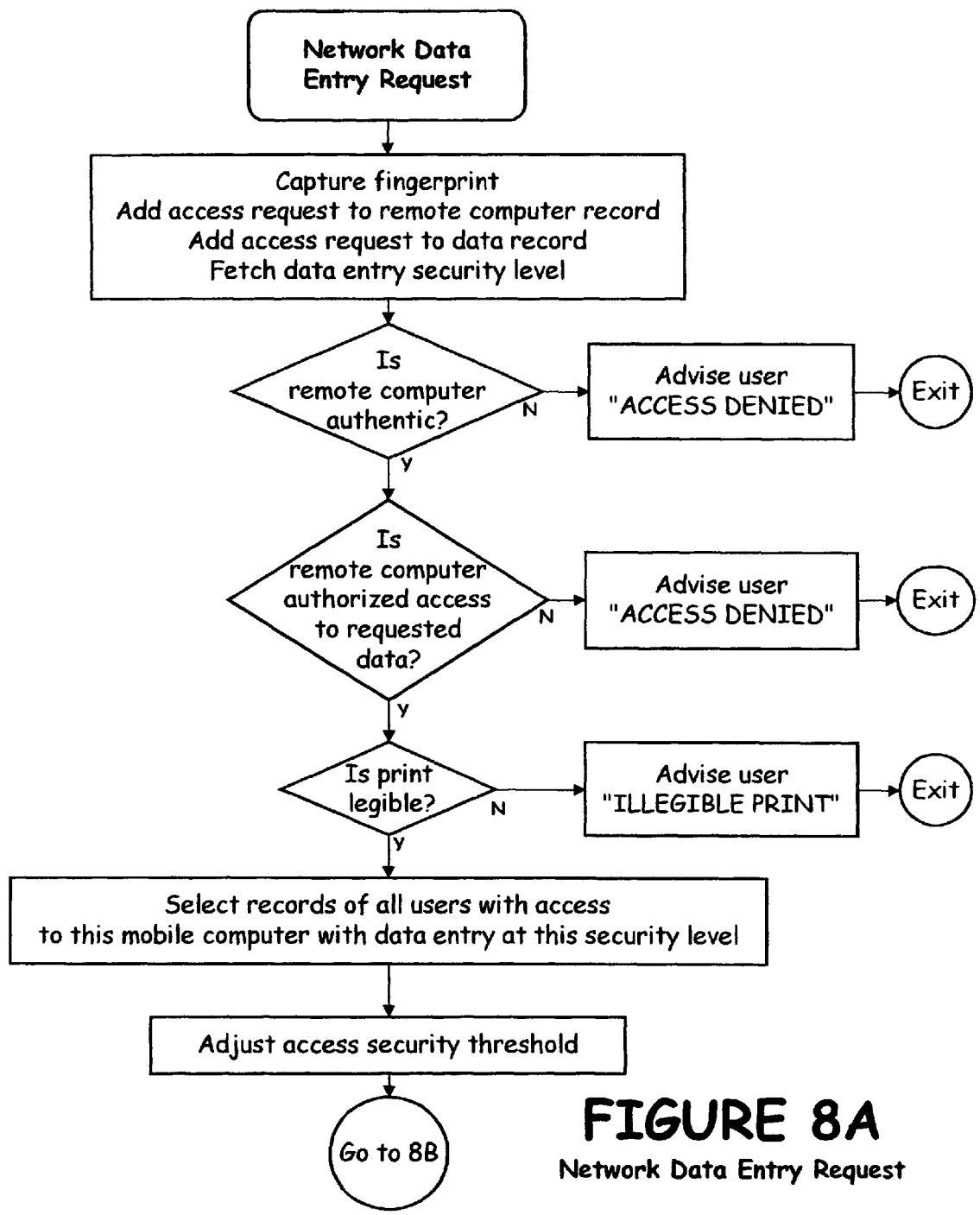

FIGS. 8A and 8B disclose a simplified logic diagram of one preferred embodiment for requesting entry of new data to the data security system of the present invention. Identity authentication is made prior to enabling entry of new data. Such authentication will do much to protect the integrity of network data and prevent any corruption thereof.

Figure 9A:
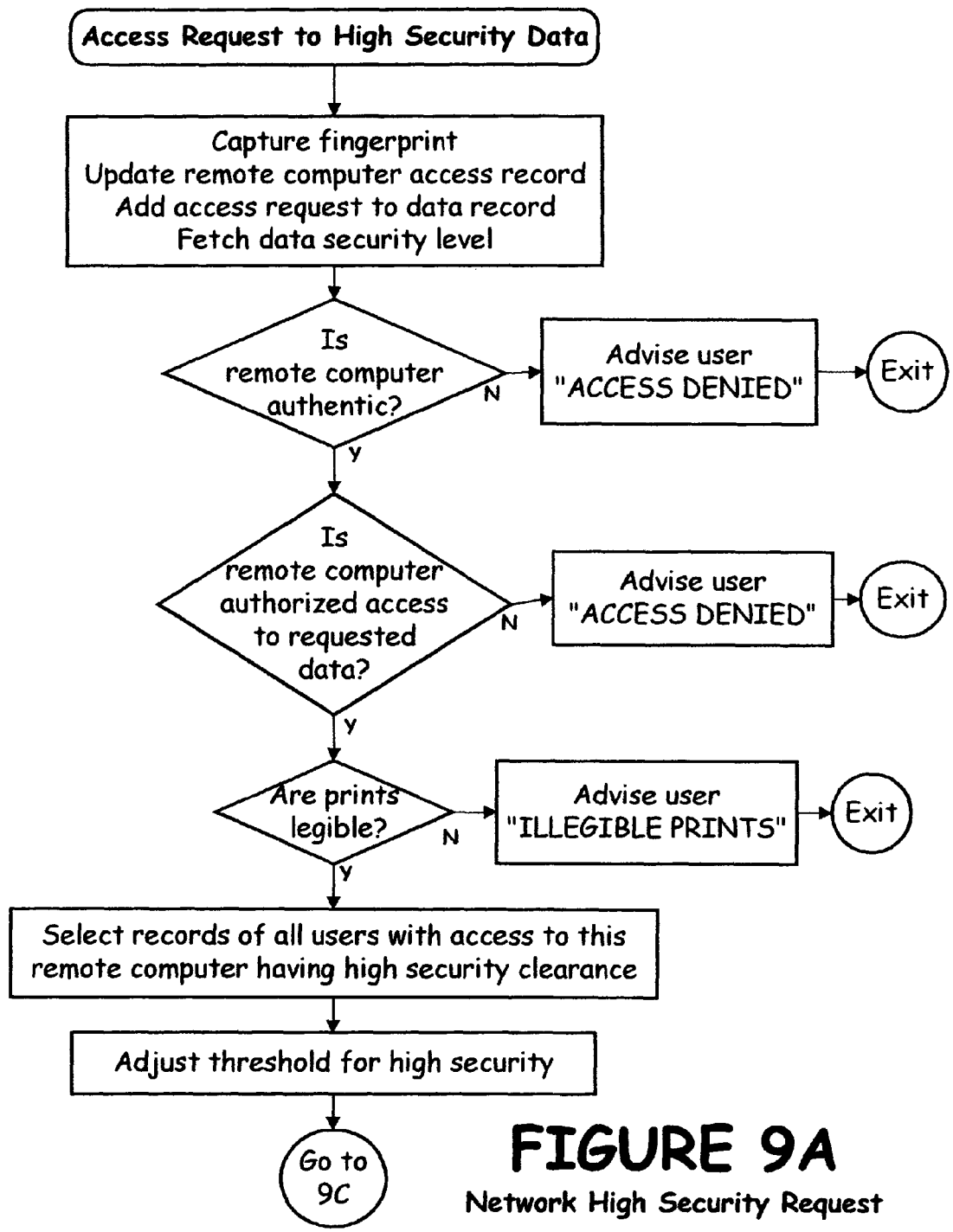

FIGS. 9A and 9C disclose a simplified logic diagram of one preferred embodiment for requesting access to high security data of the data security system of the present invention, the high security data access request requiring a match authentication of a pair of user fingerprints. The handheld computer of FIG. 1A enables (for example) the capture of multiple fingerprints.

FIGS. 9B and 9C disclose a simplified logic diagram of another preferred embodiment for requesting access to high security data for the data security system of the present invention. The system supplies the user with misinformation if the remote computer is counterfeit (see also FIGS. 7B and 7C above).

FIG. 10A disclose a simplified layout for a user record of one preferred embodiment of the data security system of the present invention. FIG. 10B discloses a simplified layout for a data access record of the preferred embodiment of the data security system of FIG. 10A. FIG. 10C discloses a simplified layout for a remote processor record of the preferred embodiment of the data security system of FIG. 10A.

FIG. 10A depicts a simplified user record for the data security system of the present invention. The user record includes the user's name, address, reference prints and signature, user authorized security level, a list of data records that the user is authorized to access, a list of handheld computers that the user is authorized to use, a history of records accessed by the user, and a list of records that the user was denied access to and when. FIG. 10B depicts a simplified data record for the data security system of the present invention. The data record includes a data record number, a data security level, names of users authorized to access this record, the reference prints of authorized users, a list of handheld computers authorized to access this record, a history of persons who accessed this record and when, and a history of all persons denied access to this record. FIG. 10C depicts a simplified computer record for the data security system of the present invention. The computer record includes a remote computer number, the names of authorized users, the reference prints of all authorized users, a list of records that can be authorized from this computer, a list of all persons authorized to access each record, a history of all persons using this computer, a history of all users denied access to the computer, and prints of all users denied access to the computer. Each of these records is updated upon the occurrence of each relevant user, record, and computer event to enable a tracking for audit purposes.

Figure 11:
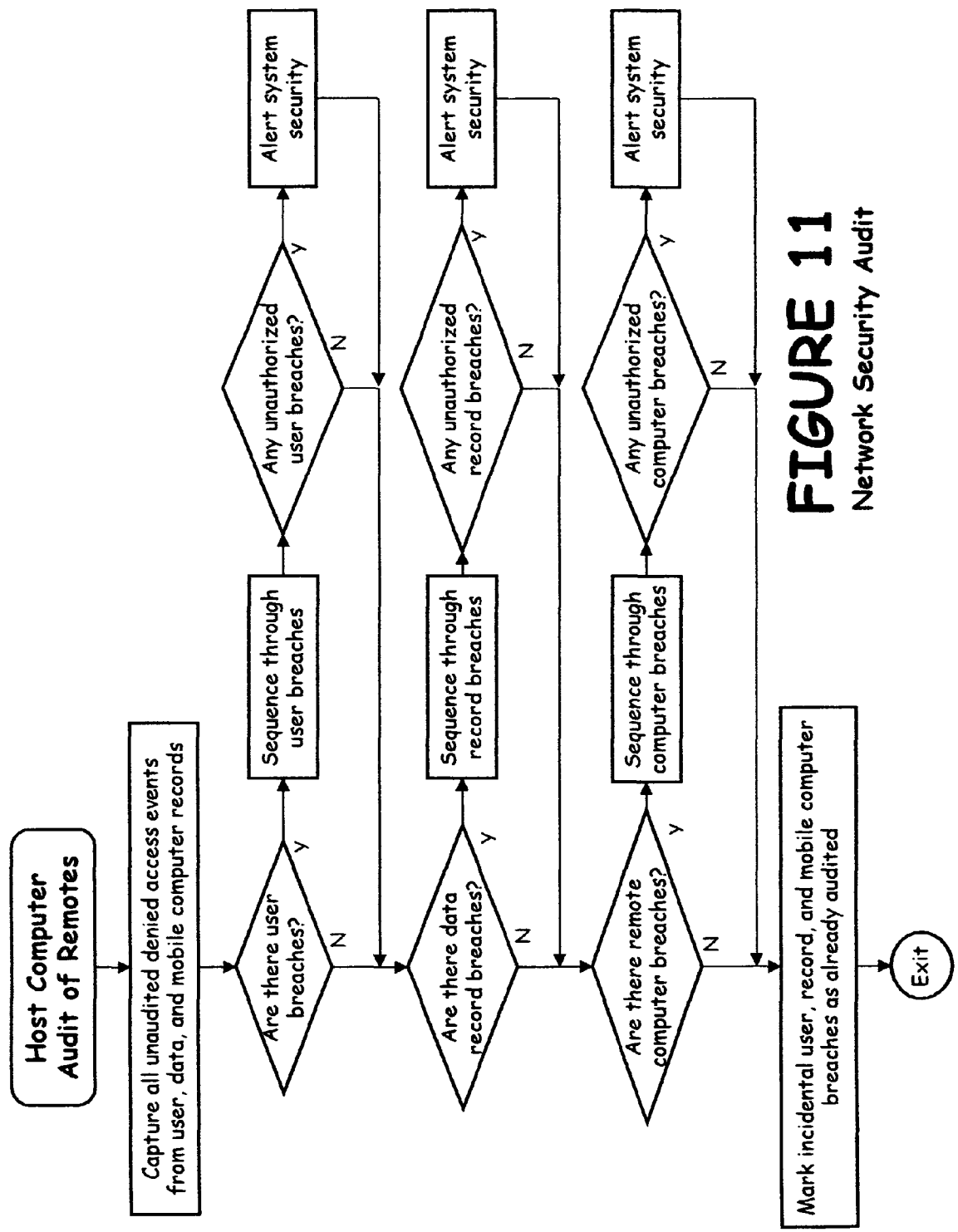
FIG. 11 discloses a simplified flowchart for performing a network security audit of the data security system of FIG. 1.

FIG. 11 discloses a simplified flowchart for performing a network security audit of the data security system of the present invention. Routines investigation as to network activity is needed to identify and remedy any security breaches. For these purposes, a distinction is made between an authorized attempt to enter a record or computer and an incidental breach—the latter being the result of sensor error or innocent mistakes by a user during network usage.

Figure 12A:
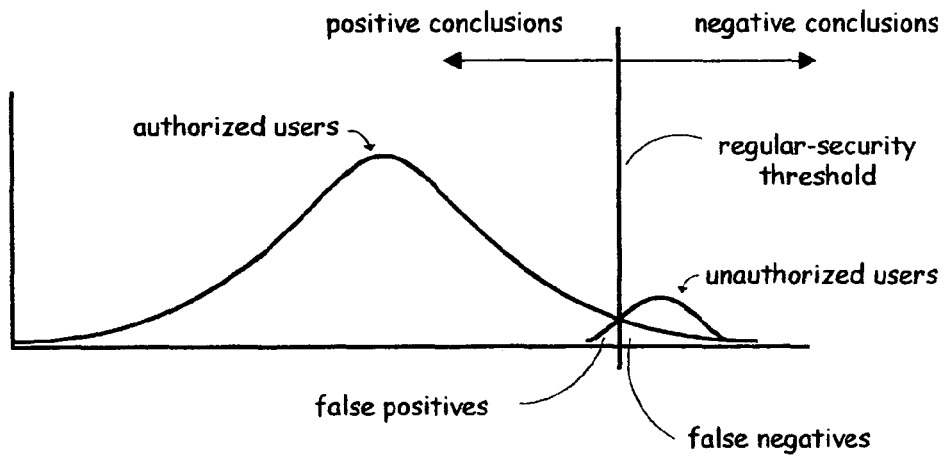
FIG. 12A discloses a simplified curve analysis for a regular security environment with the data security system of FIG. 1, where the threshold position is located at the juncture of the normal curve for authorized users and the normal curve for unauthorized users.
Figure 12B:
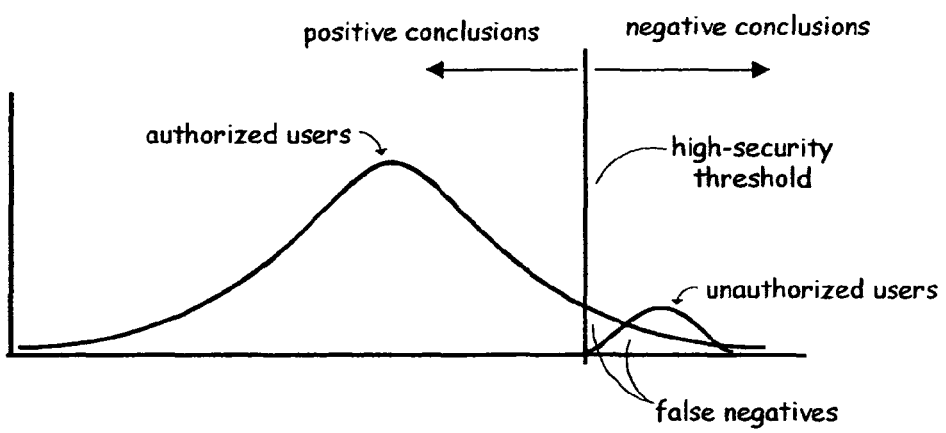
FIG. 12B discloses a simplified curve analysis showing for high-security applications with the data security system of FIG. 1, the curve analysis being similar to FIG. 12A, where the position of the threshold has been repositioned to minimize false negatives.

FIG. 12A discloses a simplified curve analysis for a regular security environment where the threshold position is located at the juncture of the normal curve for authorized users and the normal curve for unauthorized users. By placing the threshold at such juncture, there will be considerably more false positives (an unauthorized user enabled access) than false negatives (an authorized user denied access)—and this is generally an acceptable balance of the competing interests. FIG. 12B discloses a simplified curve analysis showing for high-security applications where the position of the threshold as shown in FIG. 12A has been repositioned to essentially eliminate false positives. In these high-security applications, essentially any unauthorized entry is unacceptable and so the threshold is adjusted—resulting in an increase in false negatives.

Several applications of the data security system of the present invention include:

Nurses and doctors can track and record patient histories as they make their rounds, using clipboard-like computers and pens to access and enter patient information over a wireless network from servers throughout the hospital. Insurance claims adjusters can assess automobile damages on site, looking up relevant cost information with the handheld computer, then printing the estimate and writing a check to the repair shop at the end of the visit.

Sales representatives can track inventory and the effect of promotional campaigns in retail stores, using a pen-based computer. At the end of the day, the information is transmitted through a phone line back to headquarters.

Government employees in the field or traveling on business can access secure data, with authentication and assurance that the person is the remote user authorized to access each data stream.

Mobile consumers can use the handheld computer as a signature pad (without a stylus) for identity authentication in commercial transaction made while on traveling.

Inkless fingerprint sensors have now been developed that capture a forensic quality fingerprint in less than a second. The fingerprint sensors packages are less than 0.75 in. wide, and smaller packages are being developed. Infineon (associated with Siemens) and STMicroelectronics (formerly SGS Thomson) manufacture the sensors of choice.

The Infineon sensor enables the integration of a miniature fingerprint sensor into a wide variety of end products. The chip is compact, and robust enough to convert a previously exotic technology-biometric user ID into an everyday reality. The chip is a small (18 mm.times.21 mm.times.1.5 mm) IC embedding a 288.times.224 pixel contact sensor array that images the lines and ridges of a human fingerprint when a user touches the device. Each pixel has an 8-bit data depth, enabling evaluation of subtle gradations (256 shades of gray) of a fingertip and their translation into a set of indices—the key identifying features of an individual fingerprint. Imaging and data transfer of an impression takes 100 milliseconds. The STMicroelectronics fingerprint sensor is substantially the same size as the Infineon sensor and that use capacitive-sensor-array technology, building silicon IC's containing an array of sensor plates. ST technology uses a capacitive sensing technique to capture, in less than one tenth of a second, a high-resolution image of a fingerprint when the finger is applied directly to the chip surface. The output of the chip is a digital representation of the fingerprint, which can be processed by the algorithms developed by SAGEM, which immediately confirm or invalidate the recognition of pre-identified persons and then be further processed by application-dependent software.

Another biometric that is recommended in the data security system of the present invention is the print image of the user's palm. Palmprint identification systems are commercially available from Printrak, A Motorola Company. Their Omnitrak™ 8.0 AFIS/Palmprint Identification Technology. Omnitrak 8.0 is a state-of-the-art integrated fingerprint and palmprint system that features highly accurate fingerprint and palmprint matching as well as continuous automated operation. The system provides support for full-dimension ANSI/NIST-FBI images and legacy images and is scalable to support the largest regional, federal and national operations.

Yet another biometric that is recommended in the data security system of the present invention involves cell capture while the processor device of the present invention is being used. The advantage of this biometric over fingerprints is that accuracy is not dependent upon the size of the sensor or print that is captured.

GeneTrace Systems has a high-resolution mass spectrometry-based method for chemical analysis of large single-stranded DNA oligomers. The mass spectra are obtained in seconds instead of the usual hours needed for gel electrophoresis currently used, and no radioactive or fluorescent materials are needed. The technique has high mass capabilities and opens new avenues of study as in chemical modifications of DNA, DNA-peptide/protein interactions such as antisense drug development. DNA sequencing and quality control for synthetic DNA and related products are also potential applications. The basic technology can be applied also to peptides and proteins and used for protein structure determination, phosphorylation, glycosylation, and other studies. Previously it had not been possible to apply mass spectrometry successfully to anything larger than about a 4-mer and thereby obtain the advantages the mass spectrometry technique can offer in precise and accurate molecular weight determination. The new physico-chemical sample preparation opens this capability to single-stranded DNA molecules above 50,000 Dalton with a mass accuracy of 0.01 percent in the 10,000 Dalton range. This is much higher accuracy and resolution than is obtainable with state-of-the-art electrophoresis techniques.

Another approach is to use surface-confined arrays of highly selective sensing elements. Chemical and biological sensors are required to perform multi-analyte measurements rapidly, accurately, and at increasingly lower cost. Arrays of immobilized single-stranded DNA (ssDNA) probes, so-called DNA chips, are being used for genetic analysis for disease detection, toxicology, forensics, industrial processing, and environmental monitoring.

The data security system of the present invention provides network access security by; (1) controlling unauthorized access to the network; (2) controlling improper access by network users; and (3) monitoring user access to network resources. The data security system of the present invention initially identifies the user, and continually controls and monitors user activity while the user is plugged in.

When wireless devices are used, system security becomes more of a concern, since an integral part of the system, in this instance the wireless computers, are not attached to the system, but rather are portable and carried by a customer. A preferred method of authenticating a remote computer is to make each remote computer unique from all others. The unique quality is identified and stored in the host processor. A comparison is made between the unique quality of the remote computer and the stored value in the host processor prior to enabling access to or entry of a data stream. This can be done with the random use photo refracted crystals as shown in U.S. Pat. No. 5,619,025 (Hickman, et al.); at least two magnetic filaments or strips and preferably includes a multiple number of filaments of differing coerciveness, magnetic field strength, magnetic field alignment, size or spacing so that when the remote computer requests data access, approval will be given only when the proper signal is provided by the ordered array of appropriate magnetic elements in the wireless computer as shown in U.S. Pat. No. 5,834,748 (Litman)

Throughout this application, various patents and applications are referenced by patent number and inventor. The disclosures of these patents and applications in their entireties are hereby incorporated by reference into this specification in order to more fully describe the state of the art to which this invention pertains.

It is evident that many alternatives, modifications, and variations of the data security system of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

I claim:

1. A pen-based computing device for entry of secure data into a secure network, the pen-based computing device having a casing, the pen-based computing device including a facial image sensor for capturing a facial image print, the facial image sensor being positioned in the pen-based computing device;

whereby placement of the facial image sensor in the pen-based computing device enables an incidental capture of the facial image of a user for purposes of identity authentication prior to each request to enter the secure data; and whereby placement of the sensor in the pen-based computing device enables a continuous capture of a facial image print while the pen-based computing device is being used; and whereby user identity authentication is provided simultaneously with each request to enter each data stream into said secure network, providing assurance that any mobile worker seeking to enter data is authorized prior to each data entry.

2. A handheld communication device for entering secure data into a secure network, said handheld communication device selected from the group consisting of a pocket computer, a palm-type computer, a cell-phone, and a pen-based based computer, said handheld communication device including a facial image sensor for capturing user facial image print, said facial image sensor being embedded in said handheld communication device;

whereby placement of said facial image sensor within said handheld communication device enables an incidental capture of said facial image print of a mobile user for purposes of identity authentication by a remote host computer prior to each request to enter the secure network data;

whereby placement of said sensor in said handheld communication device enables a continuous capture of a facial image print while said handheld communication device is being used; and whereby user identity authentication is provided simultaneously with each request to enter each data stream into said secure network, providing assurance that any mobile worker seeking to enter data is authorized prior to each data entry.

3. The handheld communication device of claim 2, wherein the facial image sensor scans user biometric data, said user biometric data including a user facial geometry scan.

4. The handheld communication device of claim 2, wherein the facial image sensor scans user biometric data, said user biometric data including a user facial thermal pattern scan.

5. The handheld communication device of claim 2, wherein the facial image sensor scans user biometric data, said user biometric data including a user retinal scan.

6. The handheld communication device of claim 2, wherein the facial image sensor scans user biometric data, said user biometric data including a user iris scan.

7. A handheld communication device for entering secure data into a secure network, said handheld communication device selected from the group consisting of a pocket computer, a palm-type computer, a cell-phone, and a pen-based based computer, said handheld communication device including a retinal scan sensor for capturing user retinal scan data or an iris scan sensor for capturing user iris scan data, said retinal scan sensor or said iris scan sensor being embedded in said handheld communication device;

whereby placement of said retinal scan sensor site or said iris scan sensor site within said handheld communication device enables an incidental capture of said retinal scan data or said iris scan data of a mobile user for purposes of identity authentication by a remote host computer prior to each request to access the secure network data;

whereby placement of said sensor in said handheld communication device enables a continuous capture of a retinal scan data or said iris scan data while said handheld communication device is being used; and whereby user identity authentication is provided simultaneously with each request to enter each data stream into said secure network, providing assurance that any mobile worker seeking to enter data is authorized prior to each data entry.

8. The handheld communication device of claim 7, further comprising a second biometric sensor.

9. The handheld communication device of claim 8, wherein said second biometric sensor is a fingerprint sensor disposed on said casing of said handheld computing device for capturing so as to capture a print image of a user fingerprint or thumb.

10. A handheld communication device for entering secure data into a secure network, said handheld communication device selected from the group consisting of a pocket computer, a palm-type computer, a cell-phone, and a pen-based based computer, said handheld communication device including a facial geometry sensor or a facial thermal pattern sensor for capturing user facial geometry print or user facial thermal pattern scan, said facial geometry sensor being embedded in said handheld communication device;
   whereby placement of said facial geometry sensor or said facial thermal pattern sensor within said handheld communication device enables an incidental capture of said facial geometry print or user facial thermal pattern scan of a mobile user for purposes of identity authentication by a remote host computer prior to each request to access the secure network data;
   whereby placement of said sensor in said handheld communication device enables a continuous capture of a facial geometry print or user facial thermal pattern scan while said handheld communication device is being used; and
   whereby said handheld communication device enables a mobile worker to have remote network access to secure data in said remote host computer enabling user identity authentication simultaneously with each request to enter said secure data providing assurance that any mobile worker seeking to enter data is authorized prior to each data entry.

11. The handheld communication device of claim 10, further comprising a second biometric sensor.

12. The handheld communication device of claim 11, wherein said second biometric sensor is a fingerprint sensor disposed on said casing of said handheld communication device for capturing so as to capture a print image of a user fingerprint or thumb.

13. The handheld communication device of claim 10, further comprising a second biometric sensor.

14. The handheld communication device of claim 13, wherein said second biometric sensor is a fingerprint sensor disposed on said casing of said handheld computing device for capturing so as to capture a print image of a user fingerprint or thumb.

15. A handheld communications device for entering secure data into a secure network, the handheld computing device selected from the group consisting of a pocket computer, a palm-type computer, a pen-based computer, and a cell-phone, the handheld communications device including:
   a casing for holding the handheld communications device;
   a first biometric sensor being disposed within the handheld communications device, the first biometric sensor capturing biometric data relative to a first biometric property, the first biometric sensor within the handheld communications device enabling an incidental capture of the first biometric property of the user for purposes of identity authentication by a remote host computer prior to each request to enter the secure data, the first biometric sensor within the handheld communications device enabling a continuous capture of the first biometric property of the user prior to each request to enter the secure data; and
   a second biometric sensor being disposed within the handheld communications device, the second biometric sensor capturing biometric data relative to a second biometric property, the second biometric sensor within the handheld communications device enabling an incidental capture of a second biometric property of the user for purposes of identity authentication by a remote host computer prior to each request to enter the secure data, the second biometric sensor within the handheld communications device enabling a continuous capture of the second biometric property of the user prior to each user attempt to enter the secure data.

16. A handheld communications device for entering secure data into a secure network, the handheld communications device selected from the group consisting of a pen-based computer, a pocket computer, a palm-type computer, and a cell-phone, the handheld communications device including:
   whereby placement of the fingerprint sensor site in the casing of the handheld communications device enables an incidental capture of the facial image of a user for purposes of identity authentication by a remote host computer prior to each request to enter the secure data;
   whereby placement of the sensor site in the casing of the handheld communications device enables a continuous capture of a fingerprint or thumbprint while the handheld communications device is being used; and
   whereby user identity authentication is provided simultaneously with each request to enter each data stream into said secure network, providing assurance that any mobile worker seeking to enter data is authorized prior to each data entry.

17. The handheld communication device of claim 16, further comprising a second biometric sensor.

18. The handheld communication device of claim 17, wherein said second biometric sensor is a fingerprint sensor disposed on said casing of said handheld computing device for capturing so as to capture a print image of a user fingerprint or thumb.

* * * * *